K. M. ANDERSON.
LOCKING DEVICE FOR LUBRICATING CUPS.
APPLICATION FILED AUG. 27, 1910.

980,043.

Patented Dec. 27, 1910.

WITNESSES:
W. M. Parham
J. S. Murray

INVENTOR
K. M. Anderson
BY John M. Spellman
ATTORNEY

UNITED STATES PATENT OFFICE.

KOS M. ANDERSON, OF TEMPLE, TEXAS.

LOCKING DEVICE FOR LUBRICATING-CUPS.

980,043.

Specification of Letters Patent. Patented Dec. 27, 1910.

Application filed August 27, 1910. Serial No. 579,254.

*To all whom it may concern:*

Be it known that I, Kos M. ANDERSON, a citizen of the United States, residing at Temple, in the county of Bell and State of Texas, have invented certain new and useful Improvements in Locking Devices for Lubricating-Cups, of which the following is a specification.

My invention relates to new and useful improvements in lubricator cups. Its object is to provide a lubricating cup provided with improved means to prevent the dislodgment of the plug employed to retain the lubricating mixture in the cup.

A further object of the invention is to provide a device of the character described that will be strong, durable, simple and efficient, and comparatively easy to construct.

Figure 1:
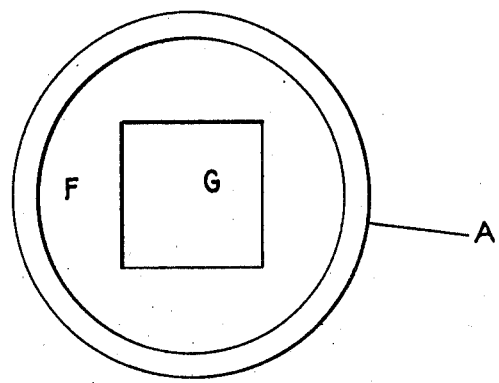
Figure 2:
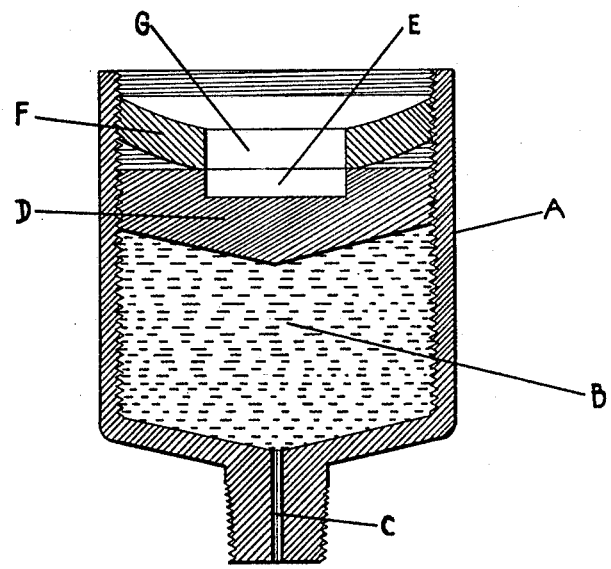

With these objects in view, my invention has relation to certain novel features of construction and operation, an example of which is described in the following specification and illustrated in the accompanying drawing, wherein:

Figure 1 is a top view of the herein described lubricator cup. Fig. 2 is a vertical cross section taken centrally through the cup.

Referring now more particularly to the drawing, wherein like letters of reference designate similar parts in all the figures, the letter A denotes a lubricator cup of well-known construction, said cup being interiorly threaded. B denotes the lubricating fluid contained in said cup, and C a passage way for the escape of the lubricating fluid. The plug D, provided with a small aperture E to receive a wrench, is threaded into the cup to prevent any possibility of the lubricating fluid or mixture being thrown out in case the cup is mounted upon a moving piece of machinery. The plug D also serves to keep the lubricating fluid free from dirt and dust.

In order to prevent the plug D from gradually working loose due to the vibration of the machinery upon which the cup is mounted, a dish-shaped plug F is screwed into the cup and made to bear upon the plug D as shown in Fig. 2. The plug F is provided with a square central aperture G adapted to receive a wrench. Owing to the dish-shaped construction of the plug F, as soon as the lower portion thereof begins to exert pressure upon the plug D, the perimeter of the plug will tend to spring outwardly, thus causing it to lock against the walls of the cup.

The above described invention is especially adapted for use upon the side rods of locomotives in connection with the lubricating cups employed to lubricate the crank pins. However, it is obvious that the device is adapted for use by any type of lubricating cup which employs a plug threaded therewithin, and that it is especially adapted for use upon machine parts which are in constant motion.

What I claim is:

1. In a lubricating cup, the interior of which is threaded, the combination with a threaded plug within the cup, a dish-shaped plug threaded within the cup, and bearing upon the first named plug.

2. In a lubricator cup, the interior of which is threaded, the combination with a plug threaded within said cup, and having a square central aperture, of a dish-shaped plug threaded within the cup and bearing upon the first named plug, and also provided with a square central aperture.

In testimony whereof I have signed my name to this specification in the presence of two subscribing witnesses.

KOS M. ANDERSON.

Witnesses:
H. D. COWAN,
L. E. POSEY.